United States Patent [19]

Osanai

[11] Patent Number: 4,497,426
[45] Date of Patent: Feb. 5, 1985

[54] MECHANISM OF CONTROLLING PARALLELISM BETWEEN THE PINCH ROLLER AND CAPSTAN SHAFT

[75] Inventor: Akira Osanai, Hachioji, Japan

[73] Assignee: Olympus Optical Co., Ltd., Tokyo, Japan

[21] Appl. No.: 527,374

[22] Filed: Aug. 29, 1983

Related U.S. Application Data

[63] Continuation-in-part of Ser. No. 303,922, Sep. 21, 1981, abandoned.

[30] Foreign Application Priority Data

Sep. 25, 1980 [JP] Japan .................................. 55-133164

[51] Int. Cl.³ ........................ B65H 5/06; B65H 23/16
[52] U.S. Cl. .................................... 226/187; 226/190; 226/194
[58] Field of Search ............... 226/174, 176, 181, 183, 226/186, 187, 190, 192, 194; 100/168

[56] References Cited

U.S. PATENT DOCUMENTS

| 1,954,187 | 4/1934 | Tappan | 226/194 X |
| 2,073,224 | 3/1937 | Ross | 226/187 X |
| 2,998,906 | 9/1961 | Vice | 226/190 X |
| 3,233,807 | 2/1966 | Wray | 226/190 X |
| 3,490,669 | 1/1970 | Watson | 226/176 |

Primary Examiner—Stuart S. Levy
Assistant Examiner—Lloyd D. Doigan
Attorney, Agent, or Firm—Frishauf, Holtz, Goodman & Woodward

[57] ABSTRACT

A mechanism for controlling parallelism between a pinch roller and capstan shaft, wherein a support arm shaft rotatably supports a support arm. A wall is provided on the base board close to the support arm shaft. The support arm shaft is inclined toward the wall. The wall is fitted with pinch roller parallelism-controlling mechanism which is pressed against the inclined support arm shaft to push it in the opposite direction to that of its inclination.

13 Claims, 2 Drawing Figures

MECHANISM OF CONTROLLING PARALLELISM BETWEEN THE PINCH ROLLER AND CAPSTAN SHAFT

This application is a continuation-in-part of application Ser. No. 303,922, filed Sept. 21, 1981, now abandoned.

BACKGROUND OF THE INVENTION

This invention relates to a mechanism for controlling parallelism between a pinch roller and capstan shaft in a tape recorder.

A drive mechanism for causing a magnetic tape to run at a constant speed while being clamped between a pinch roller and capstan shaft is widely applied to, for example, a tape recorder. With a mechanism for driving a magnetic tape at a constant speed, it is necessary that the pinch roller be parallel with the corresponding capstan shaft. The reason is that derangement in the parallelism between said two members causes a magnetic tape clamped therebetween to be displaced either upward or downward from the normal position, giving rise to the stretching of only one side of the magnetic tape to obstruct its constant run. To avoid such difficulties, various mechanism have been provided to control parallelism between the pinch roller and capstan shaft. The pinch roller is generally rotatably supported by a support arm which is fixed to an immovable base board or a movable head lever base board. Parallelism between the pinch roller and capstan shaft is maintained by controlling the inclination of the pinch roller shaft or support arm shaft. According to a known mechanism for controlling parallelism between a pinch roller and capstan shaft disclosed, for example, in Japanese Utility Model Publication No. 37851/73, a pinch roller shaft is rotatably supported between the base board and support arm movably fitted thereto. The support arm is provided with a non-threaded hole into which a screw is loosely inserted. The screw is threadedly engaged with a female screw formed in the base board through the hole, thereby immovably setting the support arm on the base board. When the screw is first loosened to allow for the free movement of the support arm, later parallelism between the pinch roller and capstan shaft is controlled, and the screw is fully engaged with the aforementioned female screw hole, then the support arm is fixedly mounted on the base board with the parallelism fully maintained. This arrangement is simple and facilitates the control of the parallelism. To assure the constant run of a magnetic tape, the pinch roller should generally be pressed against the capstan shaft with a certain magnitude of urging force. With the above-mentioned arrangement, however, the support arm is fixed to the base board, making it impossible to adopt the known process of pressing the support arm against the capstan shaft, and presenting difficulties in applying a constant urging force to the support arm. Moreover, the known mechanism for controlling parallelism between the pinch roller and capstan shaft objectionably demands a large space.

SUMMARY OF THE INVENTION

It is accordingly the object of this invention to provide a mechanism of simple arrangement for controlling parallelism between the pinch roller and capstan shaft which allows for the easy control of the parallelism and moreover does not occupy a large space.

To attain the above-mentioned object, means for controlling parallelism between the pinch roller and capstan shaft comprises a support arm shaft rotatably supporting a support arm; and a wall on a base board close to the support arm shaft. The support arm shaft is inclined toward the wall. The wall is fitted with pinch roller parallelism-controlling means which is pressed against the inclined support arm shaft to push it in the opposite direction to that of the inclination of the support arm shaft.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
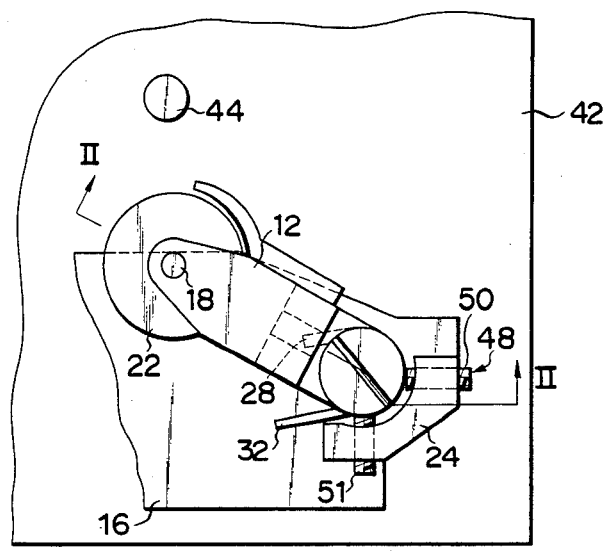
FIG. 1 is a top plan view of a mechanism embodying this invention for controlling parallelism between the pinch roller and capstan shaft.
Figure 2:
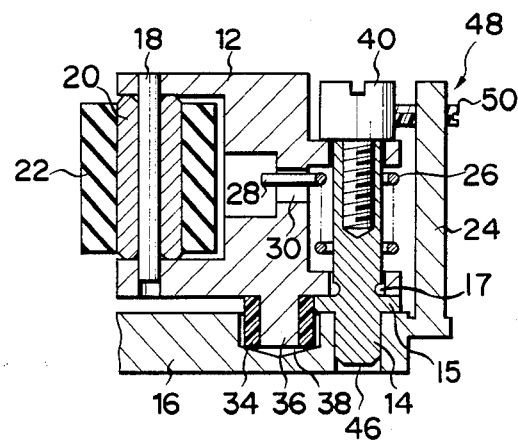
FIG. 2 is a sectional view on line II—II of FIG. 1.

As shown in FIG. 1, a support arm 12 of a pinch roller has its longitudinal section shaped like a fork. The pinch roller support arm 12 is rotatably supported by a shaft 14, which is fixed to a movable member, for example, a head lever 16. A pinch roller shaft 18 is fixed to the support arm 12. A pinch roller 22 is rotatably supported by the pinch roller shaft 18 by means of a bearing 20. A screen-shaped upright wall 24 partly shielding the shaft 14 extends upwardly from the head lever 16. A torsion coil spring 26 (FIG. 2) is wound about the shaft 14. One end 28 of the torsion coil spring 26 is inserted into a hole 30 of the support arm 12. The other end 32 of the torsion coil spring 26 is pressed against the end portion of the lateral side of the upright wall 24. The support arm 12 is so urged by the torsion coil spring 26 as to cause the pinch roller 22 to be rotated clockwise (FIG. 1) about the shaft 14. The support arm 12 comprises an integral downwardly extending projection 36 fitted with a shock-absorbing ring 34 made of, for example, polyvinyl chloride. The projection 36 is loosely inserted into a guide hole 38 formed in the head lever 16. Therefore, the support arm 12 is urged by the torsion coil spring 26, until the shock-absorbing ring 34 touches the lateral wall of the guide hole 38. Further, the support arm 12 can be rotated against the urging force of the torsion coil spring 26 in a space defined between the shock-absorbing ring 34 and guide hole 38. A screw 40 constituting part of the shaft 14 is threadedly engaged with the shaft, thereby adjusting the vertical movement of the support arm 12 relative to the shaft. Shaft 14 has an annular outwardly extending flange 15 at the lower end thereof and an annular groove 17 above flange 15.

The pinch roller shaft 18 is demanded to be set parallel with the corresponding vertical capstan shaft 44 mounted on the base board 42. Otherwise, a tape clamped between the these shafts 18, 44 is displaced upwardly or downwardly, failing to run properly. The capstan shaft 44 is mounted on the base board 42. The shaft 14 of the support arm 12 for the pinch roller shaft 22 is set on a different member, that is, a head lever sliding on the base board 42. Even where, therefore, a hole 46 into which the shaft 14 is forcefully inserted is rendered sufficiently vertical, the parallel relationship of the pinch roller shaft 18 with the capstan shaft 44 is not always assured.

According to this invention, the shaft 14 is inclined beforehand toward the central portion of the upright wall 24. The inclination of the shaft 14 toward the upright wall 24 can be effected by various means, for example, by manually inclining the shaft 14 forcefully inserted into the hole 46 toward the upright wall 24 or forming the hole 46 itself in an inclined state. The shaft 14 thus inclined is pushed backward by parallelism-controlling means 48 which adjusts the inclination of the shaft 14 to assure the proper parallelism of the shaft 14 with the capstan shaft 44. The parallelism-controlling means 48 can sufficiently serve the purpose, provided it has a function of pressing the shaft 14 against its inclination thereby to assure its parallelism with the pinch roller shaft 18. The parallelism-controlling means 48 is provided with a pair of set screws 50, 51 which are threadedly engaged with the upright wall 24 and whose outer end is pressed against the lateral wall of the screw 40. The set screws 50, 51 are so positioned as to receive a component of a reaction force produced in the shaft 14 when it is pressed by the screw 40. The set screws 50, 51 adjust the magnitude of a pressure impressed on the shaft 14, thereby assuring the parallelism of the pinch roller shaft 18. The parallelism-controlling means 48 provided with the above-mentioned set screws 50, 51 can easily and quickly assure the parallelism of the pinch roller shaft 18 by adjusting the extent to which the set screws 50, 51 are made to project. Further, the parallelism-controlling means 48 allows for application of small pitch set screws, enabling a fine adjustment of the parallelism.

With a pinch roller parallelism-controlling mechanism embodying this invention, a wall is built on the base board close to a shaft for rotatably holding the pinch roller support arm. The shaft is inclined. The pinch roller parallelism-controlling means is mounted on the wall in a state pressed against the support arm shaft to push it against its inclination. With the pinch roller parallelism-controlling mechanism arranged as described above, the pinch roller parallelism can be easily controlled by changing the magnitude of a force with which the support arm shaft is pressed by the pinch roller parallelism-controlling means. To attain the object intended by the invention, it is sufficient to build a wall on the base board and mount the pinch roller parallelism-controlling means on the wall in a state pressed against the support arm shaft. This arrangement is extremely simple and occupies a considerably small space. Where the pinch roller parallelism-controlling mechanism is constructed by threadedly fitting the pinch roller parallelism control means to the wall by at least two screws, then it is possible to control the pinch roller parallelism with a high precision over a broad range by properly selecting the pitch of the screws. Parallelism between the pinch roller and capstan shaft is controlled by varying the extent to which the shaft of the pinch roller support arm is inclined. The support arm is rotatable about its shaft. Where, therefore, the support arm shaft is wound with, for example, a torsion coil spring to urge the support arm, then the urging force is also applied to the pinch roller, thereby causing the pinch roller to be pressed against the capstan shaft with a certain urging force.

What is claimed is:

1. In a tape recorder comprising a pinch roller adapted to engage with a capstan shaft; a support arm shaft mounted on a base board; and a pinch roller support arm coupled to said support arm shaft,
   the improvement comprising means for controlling parallelism between said pinch roller and said capstan shaft, said parallelism controlling means including:
   a wall extending upwardly relative to said base board, close to said support arm shaft;
   said support arm shaft having one end fixedly and nonadjustably connected to said base board;
   said support arm shaft extending upwardly from said base board such that it has a tendency to be inclined toward said wall to produce a reaction force against reducing the inclination thereof, said support arm shaft having a free end portion remote from said one fixed end, and rotatably holding said support arm; and
   a pinch roller parallelism-adjusting means coupled to said wall, and which is located within the limits of the thickness of said pinch roller support arm, said parallelism-adjusting means including adjustable pressing means which presses against said free end portion of said support arm shaft to push said support arm shaft in a direction away from said wall, against said inclining tendency and said reaction force of said support arm shaft.

2. The mechanism of claim 1 wherein said pinch roller parallelism-controlling means comprises two screw members threadedly coupled to said wall, the outer end of said two screw members being pressed against said support arm shaft and against which the reaction force of said support arm shaft acts.

3. The mechanism of claim 2, further comprising a torsion spring wound around said support arm shaft, one end of said torsion spring being fitted into a hole formed in said support arm, and the other end of said torsion spring being pressed against said wall on said base board, to produce an urging force causing said support arm to be rotated about said support arm shaft toward said capstan shaft.

4. The mechanism of claim 2, wherein said support arm comprises a downwardly extending projection directed toward said base board and loosely inserted into a guide hole, for controlling the rotation of said support arm, said guide hole being formed in a guide hole defining means on said base board; and a shock absorbing member is coupled to said downwardly extending projection for selectively abutting against a surface of said guide hole.

5. The mechanism of claim 2, wherein said pinch roller shaft has an outer flange formed thereon adjacent to said base board.

6. The mechanism of claim 1, further comprising a torsion spring wound around said support arm shaft, one end of said torsion spring being fitted into a hole formed in said support arm, and the other end of said torsion spring being pressed against said wall on said base board, to produce an urging force causing said support arm to be rotated about said support arm shaft toward said capstan shaft.

7. The mechanism of claim 6, wherein said support arm comprises a downwardly extending projection directed toward said base board and loosely inserted into a guide hole, for controlling the rotation of said support arm, said guide hole being formed in a guide hole defining means on said base board; and a shock absorbing member is coupled to said downwardly extending projection for selectively abutting against a surface of said guide hole.

8. The mechanism of claim 1, wherein said pinch roller shaft has an outer flange formed thereon adjacent to said base board.

9. The mechanism of claim 8, wherein said pinch roller shaft has an annular groove thereon to facilitate bending of said pinch roller shaft in the vicinity of said annular groove under the influence of said pressing means.

10. The mechanism of claim 9, wherein said annular groove is arranged above said outer flange.

11. The mechanism of claim 1, wherein said pinch roller shaft has an annular groove thereon to facilitate bending of said pinch roller shaft in the vicinity of said annular groove under the influence of said pressing means.

12. The mechanism of claim 11, wherein said annular groove is formed adjacent said end thereof which is fixedly and non-adjustably connected to said base board.

13. The mechanism of claim 10, wherein said angular groove and said outer flange are located adjacent the end of said pinch roller shaft which is fixedly and non-adjustably connected to said base board.

* * * * *

UNITED STATES PATENT AND TRADEMARK OFFICE
CERTIFICATE OF CORRECTION

PATENT NO. : 4,497,426

DATED : February 5, 1985

INVENTOR(S) : Akira OSANAI

It is certified that error appears in the above-identified patent and that said Letters Patent is hereby corrected as shown below:

IN THE TITLE:

The Title should read --MECHANISM FOR CONTROLLING PARALLELISM BETWEEN A PINCH ROLLER AND CAPSTAN SHAFT--.

Signed and Sealed this

Tenth Day of September 1985

[SEAL]

Attest:

DONALD J. QUIGG

*Attesting Officer*   *Acting Commissioner of Patents and Trademarks - Designate*